July 19, 1955

E. ACKERLIND 2,713,680

BINARY CONTACT MAKING COUNTER

Filed June 21, 1949

2 Sheets-Sheet 1

INVENTOR.
ERIK ACKERLIND
BY Herbert E. Metcalf
Attorney

INVENTOR.
ERIK ACKERLIND
BY Herbert E. Metcalf
Attorney 2,713,680

BINARY CONTACT MAKING COUNTER

Erik Ackerlind, Redondo Beach, Calif., assignor to Northrop Aircraft, Inc., Hawthorne, Calif., a corporation of California Application June 21, 1949, Serial No. 100,461

19 Claims. (Cl. 340—347)

This invention relates to counters, and more particularly, to a binary contact-making counter wherein rotary motion is converted into a binary number.

For use with electronic counters and computers, some means is used to electrically set up or inject a desired number into the computer. Since many computers operate by means of vacuum tube flip-flops, calculations are frequently performed on a two-number basis (called a binary system). Thus the injected number must also be in binary form. The number set up in binary form may be converted from a mechanical input, such as the position of a rotating shaft, for example.

In automatic control systems, where the position of a device is sensed and calculated by a binary computer, the actual position of the device may be converted into a binary electrical indication for purposes of comparison with a precomputed or desired position. The difference between the actual and desired binary number would cause a servo system to move the device to the desired position.

Present methods of converting wheel or shaft rotation into recognizable numbers have a disadvantage in that stopping the converter at certain positions will result in no reading, or an erroneous reading. This is caused by two factors—(1) lack of good sensitivity of the sensing or pick-off device, since a finite motion of the shaft is required, and (2) mechanical imperfections, such as backlash, which prevent ideal alignment of the components.

It is an object of this invention to provide means for converting rotational motion into an accurate binary number suitable for use with a binary digital computer at all positions of the converting means.

Several other objects and features of advantage will be apparent and will be noted in the following detailed description of a preferred apparatus embodying this invention, and the invention is not deemed to be limited to the specific apparatus disclosed herein, as various forms may be adopted within the scope of the appended claims.

Briefly, the present invention comprises a plurality of geared stages where electrical switching at each stage gives a measurement of the amount of rotation of an input shaft. The stages are geared to each other so as to produce one revolution of each stage for every predetermined number of whole revolutions of the preceding stage, and this is accomplished in an intermittent manner in order to prevent erroneous switching indications. Unique switching means comprising two switches at each stage is preferably provided to insure a more accurate conversion of angular displacement to electrical potentials. The end result is a binary number that is an accurate measure of the amount of rotation of the input shaft.

This invention may be more fully understood by reference to the accompanying drawings of the preferred embodiment, wherein.

Figure 1:
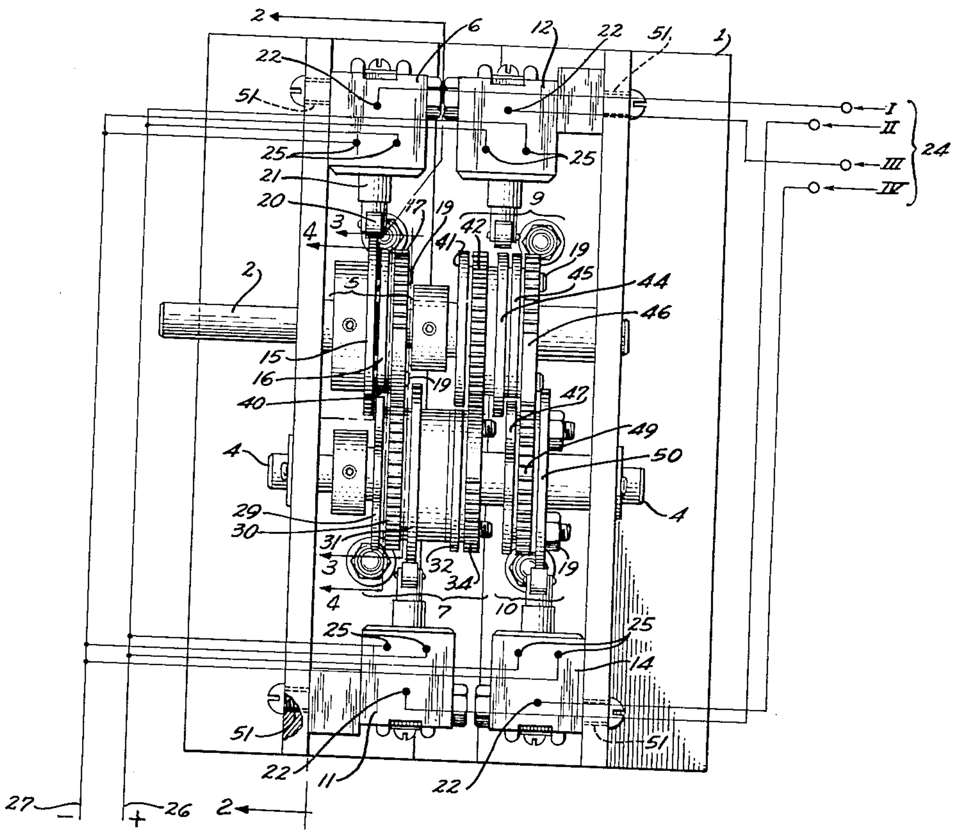
Figure 1 is a plan view of a four-stage binary converter embodying the present invention.

Referring directly to Figure 1, the converter of my invention comprises a structural frame 1 containing an input shaft 2 and an idler shaft 4 parallel to the input shaft 2. The input shaft 2 carries, and is attached to, a stage I assembly 5 cooperating with a stage I switch 6 firmly secured to the frame 1. The stage I assembly 5 mates with a stage II assembly 7 freely rotatable on the idler shaft 4. Similarly, the stage II assembly 7 mates with a stage III assembly 9 freely rotatable on the input shaft 2, the latter stage mating with a stage IV assembly 10 also freely rotatable on the idler shaft 4. A stage II switch 11, stage III switch 12, and stage IV switch 14 are installed in the frame 1 to be operated by their respective stages.

Figure 2:
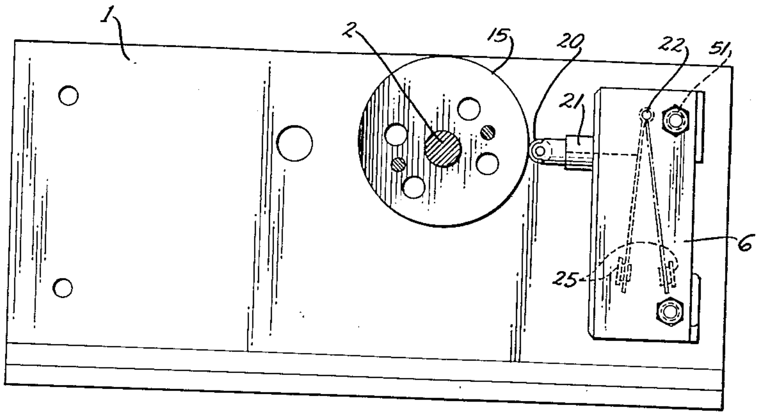
Figure 2 is a sectional view taken at line 2—2 of Figure 1, showing a switch-actuating eccentric.

Stage I assembly 5 includes an eccentric 15, cam 16, and a half-gear 17, all securely fastened together by screws 19. The eccentric 15 is positioned to contact an actuator roller 20 on a plunger shaft 21 of the stage I switch 6 positioned at right angles to the input shaft 2. Thus during each revolution of the input shaft 2, the stage I switch 6 will go through one complete make-break cycle. The switch is a double pole, single throw, microswitch with practically no position lag between tripping positions as reached from either direction. Figure 2 shows the operation of the eccentric 15 and stage I switch 6.

The common output terminal 22 of each microswitch is wired to one of a series of output contacts 24 (Figure 1), where the output indication appears. Of the two input terminals 25 of each switch, one is wired to a source of positive electrical potential 26 and the other is wired to a source of relatively negative electrical potential 27. Thus, the output at each stage will be either positive or negative, depending on which input terminal is connected to the common terminal within the switch. Each output contact 24 will reverse its polarity once for every 180 degrees of rotation of the stage into which it is wired.

Stage II assembly 7 includes a keeper 29, placed opposite the cam 16 of the first stage, a gear 30, placed opposite the half-gear 17 of the first stage to be driven thereby, a second stage eccentric 31, placed opposite the stage II switch 11, a second stage cam 32, and a second stage half-gear 34, all these components of the stage II assembly 7 being securely fastened together like the stage I assembly 5.

Figure 3:
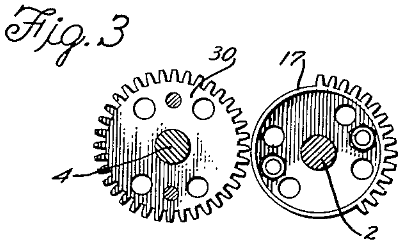
Figure 3 is a fragmentary view taken as indicated by line 3—3 of Figure 1, showing a driven gear and a driving half-gear.

The gear 30 and first stage half-gear 17 are constructed and related as shown in Figure 3. The first stage half-gear contains 15 teeth which extend somewhat less than halfway around the circumference, and the gear 30 is made to the same dimensions but is a complete gear containing 36 teeth which mesh with the first stage half-gear 17. Thus the gear 30 will rotate at the same speed as the half-gear 17 when the latter is in driving position with its teeth facing the gear 30, but the gear will be rotated only one-half revolution while the half-gear 17 rotates a full revolution. As the half-gear 17 continues to rotate, it will pick up the gear 30 at exactly 180-degree intervals and drive the stage II assembly 7 through exactly half the full number of revolutions of the stage I assembly 5.

Figure 4:
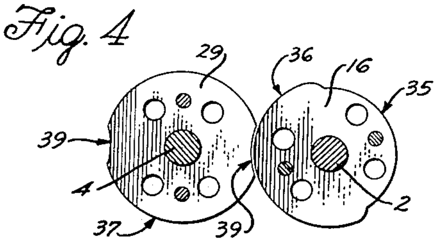
Figure 4 is a fragmentary view taken as indicated by line 4—4 of Figure 1, showing a set of keeper cams.

The keeper 29 and first stage cam 16 are constructed and arranged as shown in Figure 4. This cam 16 comprises a body having a minor arc 35 and a major arc 36 of greater radius, both arcs being concentric with the input shaft 2. The major arc 36 extends for its full radius completely around half of the circumference of the cam 16, and then tapers rather abruptly into the minor arc 35 at each end thereof. The minor arc, therefore, extends for substantially less than 180 degrees around the cam 16. The keeper 29 comprises a circular plate 37 with two arcuate depressions 39 spaced 180 degrees apart around its circumference. The radius of each depression 39 is substantially equal to the radius of the major arc 36 on the first stage cam 16. The diameter of the circular plate 37 is so designed that when it is just opposite the minor arc of the first stage cam 16, a nominal clearance 40 (Figure 1) exists.

Thus it is seen that while the circular plate 37 is opposite the minor arc 35, rotation of both the first and second stages is permitted, but when the major arc 36 is opposite either depression, only the first stage is permitted to rotate, since the major arc 36 interferes with the circular plate 37 on each side of the depression 39 and locks the stage II assembly 7 in place against rotation. At the stage I assembly 5, the half-gear 17 and the cam 16 are installed with the half-gear teeth located diametrically opposite the major arc 36. This arrangement acts to allow rotation of the stage II assembly 7 only while being driven by the first stage half-gear 17, the forward end of the major arc 36 entering one of the depressions 39 just as the driving teeth on the half-gear 17 become disengaged from the gear 30.

The second stage eccentric 31 operates the stage II switch 11 as is done at the stage I assembly 5, i. e., the stage II switch 11 will go through one complete make-break cycle for each full revolution of the stage II assembly 7. Therefore, the stage I switch 6 will be operated twice for every one operation of the stage II switch 11, as the input shaft 2 is rotated, thus forming the basis for the binary output indication.

The second stage cam 32 and second stage half-gear 34 mate, respectively, with a third stage keeper 41 and a third stage gear 42, to drive the stage III assembly 9 through one complete revolution for each two revolutions of the stage II assembly 7, in a manner identical to that described hereinbefore.

A third stage eccentric 44 is provided to actuate the stage III switch 12. The addition of the third stage therefore allows twice as many revolutions of the input shaft 2 to be counted as is possible with two stages only. Likewise, the stage III assembly 9 carries a third stage cam 45 and a third stage half-gear 46 to mate, respectively, with a fourth stage keeper 47 and a fourth stage gear 49 in the stage IV assembly 10, which also has a fourth stage eccentric 50 to actuate the stage IV switch 14.

The eccentrics and switches of all stages, however many are incorporated, are positioned by means of adjustment in over-size holes 51 in the frame 1 so that each switch of all stages being driven at any instant will be actuated simultaneously, to produce a change in the binary output number at the position where the input shaft 2 completes each half revolution. To make the converter record or indicate the number of revolutions of a desired device, the device would be geared to the input shaft 2 at a 2 to 1 ratio. Then, a half revolution of the stage I assembly 5, changing the output number by one, will correspond to one revolution of the desired device.

The angular motion of the device which is desired to be measured may be indicated in units other than revolutions merely by gearing the device to the input shaft 2 at the proper ratio. For example, when the desired device is so geared as to complete one revolution for each 180 revolutions of the input shaft 2, the output will be indicated in degrees of rotation of the desired device.

It is thus seen that the cams and keepers function to prevent gear train creep when the individual stages are not being driven by the preceding stages. Hence, succeeding stages will always be picked up at the proper tooth.

Due to inertia, the driven stages might continue to rotate after the teeth on the previous half-gear have been disengaged, if it were not for the provision of the cams and keepers.

The number of stages in the converter is unlimited. Every complete stage, except the first and last, would include a switch-operating eccentric, a keeper, a cam, a full gear, and a half-gear or segment.

In the foregoing discussion, mention is made of only one switch per stage in the converter, but erroneous readings might result if any stage were revolving slowly when the switch rollers were nearing the switching area on the eccentrics. Any backlash in the gears or minute mechanical imperfections would cause this. Therefore, I have devised the following scheme to eliminate these erroneous readings.

Figure 5:
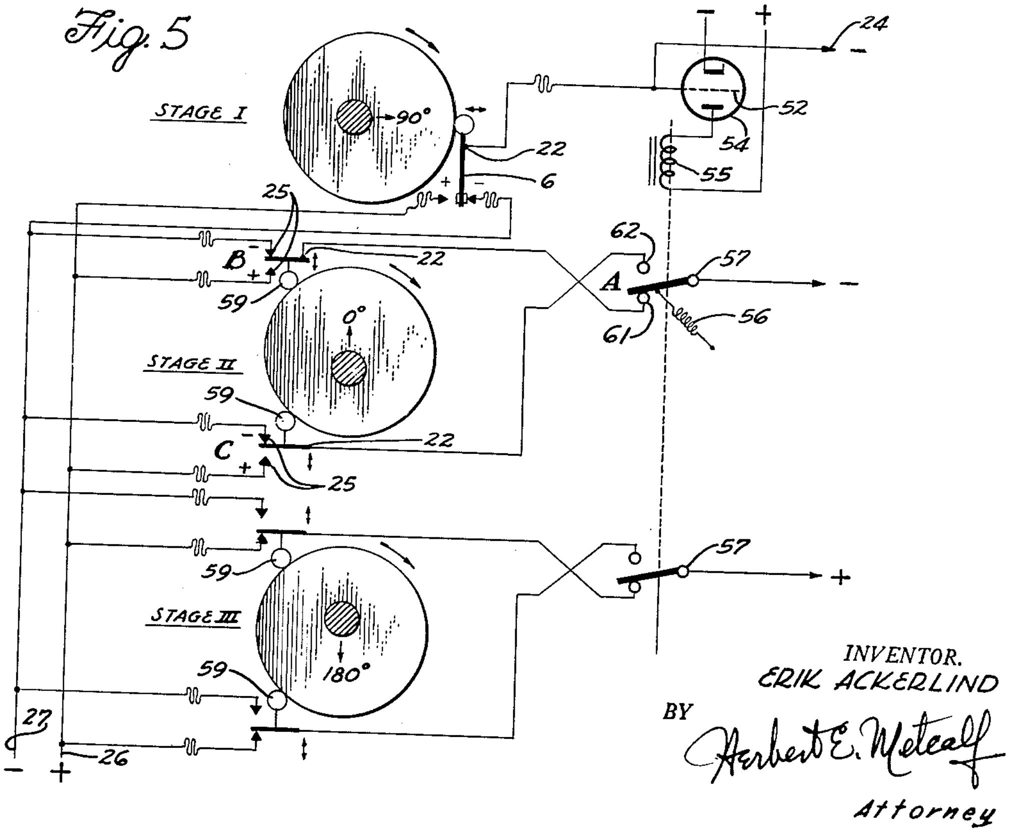
Figure 5 is a schematic view showing in diagrammatic form a modification of the converter to incorporate two switches per stage and an electro-mechanical output indicating means.

As shown in the modification of Figure 5, stage I retains only one micro switch but its common output terminal 22 is wired to the grid 52 of a vacuum tube 54 as well as to an output contact 24. The vacuum tube plate circuit contains a solenoid coil 55 adapted to actuate a multiple-section two-position relay switch A. When the grid 52 is sufficiently negative to reach the cut-off point of the tube, no current will flow, and the coil 55 will be deenergized to allow the relay A to assume a downward position under the action of a relay spring 56. When the grid 52 is positive, as when stage I has rotated 180° from the position shown, the tube conducts current and energizes coil 55 to move relay A to the upper position. The output indication from each succeeding stage is taken from the common pole 57 of each relay switch section. Therefore, for each half revolution of stage I, the output polarity of stage I will be reversed, and the output indication of each succeeding stage will simultaneously switch from its lower relay contact to the upper one, or vice versa.

Each stage following stage I incorporates two micro switches, B and C, each having a follower-actuator 59 riding on its respective eccentric. The followers 59 are insulated from the switch terminals, and no operating current flows through the eccentric. Switches B and C are separated from each other, by an amount to be discussed later, and therefore, there will be a difference in the input terminal 25 closed by the switches controlled by the followers 59. The input terminals 25 are respectively connected to positive and negative electrical sources 26 and 27, as before, along with the input terminals of the stage I switch 6, but the common output terminal 22 of switch B is wired to the lower relay contact 61 of the relay section for that stage, and the common output terminal 22 of switch C is wired to the corresponding upper relay contact 62.

When stage II of the converter is in the condition shown in Figure 5, switch B is riding on a high portion of the eccentric and has closed the negative input terminal. Switch C is riding on a low portion of the eccentric and has also closed its negative input terminal. Therefore, the output from stage II is now negative, regardless of the position of relay A.

As stage II rotates clockwise, for example, in accordance with the gearing described before, switch B will be tripped to the lower, positive, side before switch C is likewise tripped. Continuing for a full revolution, switch B will again be tripped, this time to its original upper position, before switch C has done the same. The placement and timing of A, B, and C is such that relay A is flipped from one position to the other in each interval between individual polarity changes of either B or C. This action insures simultaneous change of output of all stages being revolved during any period of operation, so that erroneous indications are not obtained for any position at which the motion of the device might be stopped. Both switches B and C are always at equal polarities when the stage at their position is at rest, during turning of the input shaft of the converter, thereby giving an unchanging output polarity regardless of relay position, until the stage in question is required to rotate.

Starting with stages I and II in the position shown in Figure 5, a typical operating cycle will now be described in full. This will be done by assuming that both stages turn in the same direction, for simplicity, and by assigning angular positions to each stage such that when the highest side of the respective eccentric is facing straight up, the position is 0° (or 360°), and by following this highest side in a clockwise direction around the full revolution through progressive positions from 0° to 360°, as indicated by the arrows and degree marks on the three stages illustrated. The accompanying table is included to present, in compact form, this same information, and it will prove valuable in quickly understanding the operation.

| Action | Angular Position Polarity | | | | Position of Relay A | Output of Stage 1, 2 |
|---|---|---|---|---|---|---|
| | Stage 1 | Stage 2 | B | C | | |
| | *Degrees* | *Degrees* | | | | |
| A flips up | 180 | 0 | − | − | up | +, − |
| Pick up Stage 2 | 270 | 0 | − | − | up | +, − |
| B changes to + | 315 | 45 | + | − | up | +, − |
| A flips down | 360 | 90 | + | − | down | −, + |
| C changes to + | 45 | 135 | + | + | down | −, + |
| Drop Stage 2 | 90 | 180 | + | + | down | −, + |
| A flips up | 180 | 180 | + | + | up | +, + |
| Pick up Stage 2, 3 | 270 | 180 | + | + | up | +, + |
| B changes to − | 315 | 225 | − | + | up | +, + |
| A flips down | 360 | 270 | − | + | down | −, − |
| C changes to − | 45 | 315 | − | − | down | −, − |
| Drop Stages 2, 3 | 90 | 360 | − | − | down | −, − |
| A flips up | 180 | 360 | − | − | up | +, − |
| Pick up Stage 2 | 270 | 360 | − | − | up | +, − |
| B changes to + | 315 | 45 | + | − | up | +, − |
| A flips down | 360 | 90 | + | − | down | −, + |
| C changes to + | 45 | 135 | + | + | down | −, + |
| Drop Stage 2 | 90 | 180 | + | + | down | −, + |

First, both stages I and II are now giving — outputs. Stage I turns to 180°, flipping relay A up, but not changing the output of stage II or turning stage II. On continuing of stage I to 270°, stage II starts to turn. At 45° of stage II, switch B trips from − to +. At 90° of stage II, A flips down, changing the output of stage II from − to +. At 135° of stage II, switch C trips from − to +, not changing the output, of course, which is coming from B. At 180° of stage II, it stops, and stage I continues 90° farther where A is flipped up as explained, to change the output of stage I only, since B and C of all other stages are at rest and have equal respective polarities. Thus, whenever relay A flips up, switches B and C are at the same polarity and stage II is stationary. Whenever A flips down, stage II has turned to make B of opposite polarity from C.

It will be noted that a change of one in the binary output number occurs each time relay A changes position, and at no other time, and this will be at every 180° turn of the input shaft attached to stage I. Another necessary requirement of the system is that any stage must rotate 180° without turning the following stage, and then pick up the following stage to turn it 180° at the same time the driving stage is turning through its second 180°.

As will be evident from an inspection of the table, switch B might be positioned to be actuated anywhere between 0° and 90° of its associated stage, and switch C might be positioned to be actuated anywhere between 90° and 180°, since these are the space intervals between actuation of the relay A. Therefore, the two switches B and C can be actuated anywhere between simultaneously and 180° apart. When positioned to be actuated as indicated in the table, there will be one switch changing position, either from − to + or + to −, for each 90° of revolution of any stage (above I).

More mention should be made of the direction of rotation of the switch-actuating eccentrics in relation to the binary number output in the foregoing discussion, since rotation in either direction is possible. Initially, then, a direction of rotation for increasing number and the polarity of the output corresponding to the "ones" and "zeros" of the binary number system must be established.

Assume that clockwise rotation causes the number to increase and that negative voltage output from a stage corresponds to a "zero." When rotation is applied at the input in a clockwise sense to a converter whose stages all indicate a negative voltage at the output, the eccentrics will revolve and so cause the outputs from the stages to change from negative to positive in the proper combinations to give an increasing binary number output. When the number capacity output of the converter is reached, the converter will reset to zero.

If rotation in a counter-clockwise sense is applied to the input, the number output will decrease until zero is reached. If counter-clockwise rotation continues after zero is reached, the number output will become all "ones" and then commence to decrease. In case that counting through zero is undesirable, an initial number content can be set into the converter such that the output is constrained to a range of values between zero and the maximum number content.

This invention eliminates the slow rotation of gears at the end of a chain of gears where the gear ratio is a constant multiple between stages, and thereby gives a more positive action. By using half-gears and Geneva-action keepers, the speed of rotation of any stage, when rotating, is identical to the speed of rotation of the first stage.

Another advantage gained by the present invention over devices using only on-off indications, is in the use of a positive-negative output from each stage, thereby giving a still more positive action.

To facilitate rotating the converter at relatively high speeds, the Geneva-action keepers and half-gears may be eliminated on the first few stages, and gears with a two to one ratio of teeth used. This would not destroy one of the objects of the invention since no appreciable creep would be experienced in the initial stages.

In lieu of the electro-mechanical relay disclosed herein, other switching means may be employed, such as electronic apparatus, for example.

From the description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A device for converting rotational motion of an object to significant electrical potentials, which comprises an input shaft adapted to be rotated by said object, a plurality of two-position electrical switches, individual switch actuating means arranged to actuate each of said switches from either of said two positions to the other, when rotated, one of said switch actuating means being connected to have a rate of rotation directly proportional to the rotation of said input shaft at all times, and the remainder of said switch actuating means being connected in series with the first of said switch actuating means, each of said remaining means being connected to rotate through an angular distance of 180° at the same speed as the next preceding means and then remain stationary during the following 180° of rotation of said preceding means to obtain an effective two to one transmission ratio between said means, an output terminal and two input terminals associated with each of said switches, whereby a first source of electrical potential applied constantly to one of said input terminals or a second source of electrical potential differing from the first and applied constantly to the other of said input terminals will be channeled to each of said output terminals in the proper combination to form a binary output number indicating directly the position of said input shaft, from a predetermined starting position.

2. A device for converting rotational motion of an object to significant electrical potentials, which comprises an input shaft adapted to be rotated by said object, a series of rotatable stages connected to be operated by the rotation of said input shaft, driving means connecting each stage with the next following stage in said series to rotate said following stage through an angular distance of 180° at the same angular speed as its respective driving stage and then cause said following, driven, stage to remain stationary during the next succeeding 180° of rotation of said driving stage, switching means at each stage adapted to select between either of two input circuits for connection to an individual output circuit, and switch actuating means at each of said stages adapted to actuate one of said switching means from one of its input circuits to the other at each 180° of rotation of its corresponding stage, all of said switch actuating means being synchronized to actuate simultaneously all switching means whose stages are rotating during any 180° of rotation of said input shaft, whereby each switching means will be actuated once for every two actuations of the switching means at the next preceding stage, and whereby a first source of electrical potential applied to one of said input circuits at each of said switching means or a second source of electrical potential differing from the first and applied to the other of said input circuits at each of said switching means will be channeled to each of said output circuits in the proper combination to form a binary output number indicating directly the position of said input shaft from a predetermined starting position.

3. Apparatus in accordance with claim 2 wherein each of said driving means comprises a complete gear attached to each of said driven stages and a half-gear attached to each of said driving stages to mesh with said complete gear, both of said gears being of the same diameter, and said half-gear having only sufficient teeth to drive said complete gear exactly one-half revolution during every full revolution of said half-gear.

4. Apparatus in accordance with claim 2 wherein each of said driving means comprises a complete gear attached to each of said driven stages and a half-gear attached to each of said driving stages to mesh with said complete gear, both of said gears being the same diameter, said half-gear having only sufficient teeth to drive said complete gear exactly 180° during every full revolution of said half-gear, and wherein locking means are provided to prevent each of said driven stages from rotating except when the teeth of the half-gear on the preceding stage are in mesh with its respective driven complete gear.

5. Apparatus in accordance with claim 2 wherein each of said driving means comprises a complete gear attached to each of said driven stages and a half-gear attached to each of said driving stages to mesh with said complete gear, both of said gears being the same diameter, said half-gear having only sufficient teeth to drive said complete gear exactly 180° during every full revolution of said half-gear, and including a locking cam rotating with each of said driving stages, a substantially circular keeper rotating with each of said driven stages and positioned opposite said locking cam, said locking cam having a raised arcuate portion extending substantially 180° around its circumference and positioned diametrically opposite the teeth of the respective half-gear on said driving stage, said keeper having two lunate depressions cut into its circumference on opposite sides thereof, the radii of said depressions each being substantially equal to the radius of said raised arcuate portion, and said keeper having an outside diameter such that said raised arcuate portion extends into one of said depressions when said raised arcuate portion is on the side adjacent said keeper, whereby each of said driven stages is prevented from creeping while not being driven by its corresponding driving stage.

6. Apparatus in accordance with claim 2 wherein each of said switching means comprises a two-pole micro switch having a plunger shaft for actuation thereof, and wherein each of said switch actuating means comprises an eccentric wheel attached to rotate with one of said stages to alternately push said plunger shaft inwardly and release said plunger shaft once for each full revolution of said eccentric, said switch being adjustably mounted to obtain said synchronized condition.

7. A device for converting rotational motion of an object to a binary number indicating the position of said object, comprising an input shaft adapted to be rotated by said object, a series of rotatable stages, the first of said stages being directly connected to said input shaft, each of the remaining stages intermittently driven by the next preceding stage to accomplish one-half a revolution of each of said stages for every full revolution of its respective preceding stage, single switching means at said first stage connected to alternate the supply of a first stage output circuit from one of two input circuits to the other at each 180° of rotation of said first stage, dual switching means at each of said remaining stages, each unit of each of said dual switching means connected to alternate the supply of one of two switch output circuits from one of said two input circuits to the other at each 180° of rotation of its respective remaining stage, one unit of each of said dual switching means being positioned so that its alternation leads the alternation of the other unit of said dual switching means by a predetermined amount as its respective stage is rotated, and selector means actuated by said first stage output circuit to alternate the supply of a stage output circuit at each of said remaining stages from one of said two switch output circuits to the other at each 180° of rotation of said first stage, the timing and placement of said units at each of said remaining stages being such that when any of said remaining stages is stationary, both of its corresponding units are connecting their respective switch output circuits to the same input circuit, and such that as any of said remaining stages starts to be rotated, as recited, said selector means connecting one of said switch output circuits to its respective stage output circuit at this time, the unit whose switch output circuit is not connected to its respective stage output circuit will be tripped first, said selector means will be tripped second, to change said stage output circuit to the switch output circuit of the unit first tripped, and the other of said units will be tripped third, before said remaining stage has rotated 180°, whereby a first source of electrical potential applied constantly to one of said input circuits or a second source of electrical potential differing from the first and applied constantly to the other of said input circuits will be channeled to each of said stage output circuits in the proper combinations to form a binary output number which changes "one" in amount at each 180° rotation of said first stage.

8. Apparatus in accordance with claim 7 wherein said stages are inter-driven by means of a complete gear attached to each driven stage and a half-gear attached to each corresponding driving stage to mesh with said complete gear, both of said gears being the same diameter, and said half-gear having only sufficient teeth to drive said complete gear exactly one-half revolution during every full revolution of said half-gear.

9. Apparatus in accordance with claim 7 wherein said stages are inter-driven by means of a complete gear attached to each driven stage and a half-gear attached to each corresponding driving stage to mesh with said complete gear, both of said gears being the same diameter, and said half-gear having only sufficient teeth to drive said complete gear exactly one-half revolution during every full revolution of said half-gear, and wherein locking means are provided to prevent each of said driven stages from rotating except when the teeth of the half-gear on the preceeding stage are in mesh with its respective driven complete gear.

10. Apparatus in accordance with claim 7 wherein said stages are inter-driven by means of a complete gear attached to each driven stage and a half-gear attached to each corresponding driving stage to mesh with said complete gear, both of said gears being the same diameter, and said half-gear having only sufficient teeth to drive said complete gear exactly one-half revolution during every full revolution of said half-gear, and including a locking cam rotating with each of said driving stages, a substantially circular keeper rotating with each of said driven stages and positioned opposite said locking cam, said cam having a raised arcuate portion extending substantially 180° around its circumference and positioned diametrically opposite the teeth of the respective half-gear on said driving stage, said keeper having two lunate depressions cut into its circumference on opposite sides thereof, the radii of said depressions being substantially equal to the radius of said raised arcuate portion, and said keeper having an outside diameter such that said raised arcuate portion extends into one of said depressions when said raised arcuate portion is on the side adjacent said keeper, whereby each of said driven stages is prevented from creeping while not being driven by its corresponding driving stage.

11. Apparatus in accordance with claim 7 wherein said single switching means comprises a two-pole microswitch fixed to said device, and having a plunger shaft for actuation thereof, and an eccentric wheel attached to rotate with said first stage to alternately push said plunger shaft inwardly and release said plunger shaft once for each full revolution of said eccentric, said switch being adjustably mounted to obtain a predetermined actuating position.

12. Apparatus in accordance with claim 7 wherein each of said dual switching means comprises two two-pole microswitches fixed to said device, each having a plunger shaft for actuation thereof, and an eccentric wheel attached to rotate with each of said remaining stages to alternately push each plunger shaft of its two respective microswitches inwardly and release said plunger shafts once for each full revolution of said eccentric, said two microswitches being separated by a predetermined distance around the circumference of said eccentric so that the actuation of one of said microswitches leads the actuation of the other microswitch by said predetermined amount, and said switches being adjustably mounted to facilitate obtaining said predetermined separation.

13. Apparatus in accordance with claim 7 wherein said selector means comprises a multiple-section relay operated by the polarity of said first stage output circuit.

14. Apparatus in accordance with claim 7 wherein said selector means comprises an electronic tube having a control grid, a magnetic relay coil in series with a current-carrying circuit of said tube, and a multiple-section spring-loaded relay actuatable by said relay coil and having a two-pole relay switch at each of said remaining stages adapted to alternate the supply of each of said remaining stage output circuits from one of its two respective switch output circuits to the other, said control grid being electrically connected to said first stage output circuit, whereby a source of relatively positive electrical potential applied to said control grid from one of said two input circuits will make said tube conductive to actuate said relay switches away from their spring-urged position, and whereby a source of sufficiently negative electrical potential applied to said control grid from the other of said input circuits will cause said tube to reach its cut-off point to release said relay switches to their spring-urged positions.

15. In a binary counter having a series of rotatable stages each intermittently driven by the next preceding stage, contact-making means for producing electrical output number indications which comprises single switching means at the first of said stages connected to alternate the supply of a first stage output circuit from one of two input circuits to the other at each 180° of rotation of said first stage, dual switching means at each remaining stage, each unit of said dual switching means connected to alternate the supply of one of two switch output circuits from one of said two input circuits to the other at each 180° of rotation of its respective remaining stage, one unit of each of said dual switching means being positioned so that its alternation leads the alternation of the other unit of said dual switching means by a predetermined amount as its respective stage is rotated, and selector means actuated by said first stage output circuit to alternate the supply of a stage output circuit at each of said remaining stages from one of said two switch output circuits to the other at each 180° of rotation of said first stage, the timing and placement of said units at each of said remaining stages being such that when any of said remaining stages is stationary, both of its corresponding units are connecting their respective switch output circuits to the same input circuit, and such that as any of said remaining stages starts to be rotated, said selector means connecting one of said switch output circuits to its respective stage output circuit at this time, the unit whose switch output circuit is not connected to its respective stage ouput circuit will be tripped first, said selector means will be tripped second, to change said stage output circuit to the switch output circuit of the unit first tripped, and the other of said units will be tripped third, before said remaining stage has rotated 180°, whereby a first source of electrical potential constantly to one of said input circuits or a second source of electrical potential differing from the first and applied constantly to the other of said input circuits will be channeled to each of said stage output circuits in the proper combinations to form a binary output number which changes "one" in amount at each 180° rotation of said first stage.

16. Apparatus in accordance wth claim 15 wherein said single switching means comprises a two-pole microswitch fixed to said counter, and having a plunger shaft for actuation thereof, and an eccentric wheel attached to rotate with said first stage to alternately push said plunger shaft inwardly and release said plunger shaft once for each full revolution of said eccentric, said switch being adjustably mounted to obtain a predetermined actuating position.

17. Apparatus in accordance with claim 15 wherein each of said dual switching means comprises two two-pole microswitches fixed to said counter, each having a plunger shaft for actuation thereof, and an eccentric wheel attached to rotate with each of said remaining stages to alternately push each plunger shaft of its two respective microswitches inwardly and release said plunger shafts once for each full revolution of said eccentric, said two microswitches being separated by a predetermined distance around the circumference of said eccentric so that the actuation of one of said microswitches leads the actuation of the other microswitch by said predetermined amount, and said switches being adjustably mounted to facilitate obtaining said predetermined separation.

18. Apparatus in accordance with claim 15 wherein said selector means comprises a multiple-section relay operated by the polarity of said first stage output circuit.

19. Apparatus in accordance with claim 15 wherein said selector means comprises an electronic tube having a control grid, a magnetic relay coil in series with a current-carrying circuit of said tube, and a multiple-section spring-loaded relay actuatable by said relay coil and having a two-pole relay switch at each of said remaining stages adapted to alternate the supply of each of said remaining stage output circuits from one of its two respective switch output circuits to the other, said control grid being electrically connected to said first stage output circuit, whereby a source of relatively positive electrical potential applied to said control grid from one of said two input circuits will make said tube conductive to actuate said relay switches away from their spring-urged position, and whereby a source of sufficiently negative electrical potential applied to said control grid from the other of said input circuits will cause said tube to reach its cut-off point to release said relay switches to their spring-urged positions.

References Cited in the file of this patent

UNITED STATES PATENTS

| | | |
|---|---|---|
| 218,421 | Benton | Aug. 21, 1879 |
| 288,976 | Chambers | Nov. 27, 1883 |
| 1,054,363 | Newell et al. | Feb. 25, 1913 |
| 1,369,097 | Goldberg | Feb. 22, 1921 |
| 2,318,591 | Couffignal | May 11, 1943 |